(12) United States Patent
Acena et al.

(10) Patent No.: US 9,227,521 B2
(45) Date of Patent: Jan. 5, 2016

(54) VEHICLE CHARGER SYSTEM WITH SAFETY GUARDIAN

(71) Applicant: Lear Corporation, Southfield, MI (US)

(72) Inventors: Miguel Angel Acena, Valls (ES); Youssef Ghabbour, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/534,268

(22) Filed: Nov. 6, 2014

(65) Prior Publication Data

US 2015/0069971 A1 Mar. 12, 2015

Related U.S. Application Data

(62) Division of application No. 13/204,939, filed on Aug. 8, 2011, now Pat. No. 8,917,054.

(51) Int. Cl.
 *H02J 7/00* (2006.01)
 *H02J 7/04* (2006.01)
 (Continued)

(52) U.S. Cl.
 CPC ......... *B60L 11/1838* (2013.01); *B60L 11/1811* (2013.01); *B60L 11/1816* (2013.01); *B60L 11/1818* (2013.01); *B60L 11/1824* (2013.01); *B60L 11/1846* (2013.01); *B60L 11/1868* (2013.01); *H02J 7/1423* (2013.01); *B60L 2210/30* (2013.01); *Y02T 10/7005* (2013.01); *Y02T 10/7066* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
 USPC .................. 320/104, 107, 134, 135, 136, 137
 See application file for complete search history.

(56) References Cited

U.S. PATENT DOCUMENTS

| 5,440,539 A | 8/1995 | Nagler |
| 8,368,350 B2 | 2/2013 | Iwanaga et al. |
| 2004/0169489 A1 * | 9/2004 | Hobbs ................... B60L 3/0046 320/104 |

(Continued)

FOREIGN PATENT DOCUMENTS

| CN | 101354268 A | 1/2009 |
| EP | 0568550 A1 | 11/1993 |

(Continued)

OTHER PUBLICATIONS

German Patent and Trademark Office, Office Action for the corresponding German Patent Application No. 10 2012 210 676.6 mailed Jan. 30, 2015.

(Continued)

*Primary Examiner* — Edward Tso
*Assistant Examiner* — Alexis A Boateng
(74) *Attorney, Agent, or Firm* — Brooks Kushman P.C.

(57) ABSTRACT

A safety guardian is operable to facilitate notifying an Electronic Vehicle Supply Equipment (EVSE) system whether a vehicle charging system is ready to accept energy. The safety guardian may be configured to facilitate control of a vehicle interface used to provide a reference voltage to the EVSE reflective of whether the charging system is ready to accept energy. The guardian may control the vehicle interface in the absence of a suitable control signal from the vehicle charging system in order to ensure the EVSE is notified when the vehicle charging system is not ready to accept energy.

10 Claims, 4 Drawing Sheets

(51) Int. Cl.
*B60L 11/18* (2006.01)
*H02J 7/14* (2006.01)

(56) References Cited

U.S. PATENT DOCUMENTS

| | | | | |
|---|---|---|---|---|
| 2007/0267997 | A1* | 11/2007 | Kanazawa | H02J 7/16 320/108 |
| 2008/0093851 | A1* | 4/2008 | Maeda | H01M 10/48 290/40 A |
| 2008/0290842 | A1* | 11/2008 | Davis | B60L 7/24 320/166 |
| 2009/0015977 | A1* | 1/2009 | Patel | G06F 1/30 361/92 |
| 2009/0243554 | A1* | 10/2009 | Gu | B60K 6/48 320/162 |
| 2009/0266631 | A1 | 10/2009 | Kikuchi | |
| 2010/0007306 | A1 | 1/2010 | Fukui et al. | |
| 2010/0079105 | A1* | 4/2010 | Iwanaga | B60K 6/445 320/109 |
| 2010/0134067 | A1* | 6/2010 | Baxter | B60L 3/0084 320/109 |
| 2010/0244782 | A1* | 9/2010 | Nagayama | B60L 11/1868 320/162 |
| 2010/0295507 | A1 | 11/2010 | Ishii et al. | |
| 2011/0029144 | A1 | 2/2011 | Muller et al. | |
| 2011/0148353 | A1 | 6/2011 | King et al. | |
| 2011/0260683 | A1* | 10/2011 | Fujii | H02J 7/045 320/109 |
| 2013/0026989 | A1* | 1/2013 | Gibbs | H01M 10/441 320/116 |

FOREIGN PATENT DOCUMENTS

| | | |
|---|---|---|
| EP | 2236345 A1 | 10/2010 |
| WO | 2011031801 A2 | 3/2011 |

OTHER PUBLICATIONS

First Office Action for the corresponding Chinese Patent Application No. 201210264277.6 mailed Apr. 30, 2014.

* cited by examiner

VEHICLE CHARGER SYSTEM WITH SAFETY GUARDIAN

CROSS-REFERENCE TO RELATED APPLICATIONS

This application is a divisional of U.S. application Ser. No. 13/204,939, filed Aug. 8, 2011, now U.S. Pat. No. 8,917,054; the disclosure of which is hereby incorporated in its entirety by reference herein.

TECHNICAL FIELD

The present invention relates to vehicle charging systems, and particularly to a vehicle charging system of the type that is required to provide a reference voltage feedback to an Electric Vehicle Supply Equipment (EVSE) system to indicate whether the vehicle charging system is ready to accept energy.

BACKGROUND

An Electric Vehicle Supply Equipment (EVSE) system may be configured to facilitate charging a high voltage (HV) battery or other energy storage element used by electric vehicles (EVs), hybrid electric vehicles (HEVs), and plug-in hybrid electric vehicles (PHEVs) to support various vehicle operations. The EVSE may require a reference voltage or other indication that a charging system of the vehicle is ready to accept energy from the EVSE. In order to prevent false indications of the readiness of the vehicle charging system to accept energy from the EVSE, a need exists to ensure the EVSE is notified when the vehicle charging system is not ready to accept energy, including during situations in which a controller or other element of the vehicle charging system may be operating improperly.

SUMMARY

One non-limiting aspect of the present invention contemplates a safety guardian operable with a vehicle interface having a switch operable between an open position and a closed position to control a voltage of a reference voltage output to an Electronic Vehicle Supply Equipment (EVSE) system, the EVSE system requiring the voltage of the reference voltage to be greater than a threshold before delivering energy to a vehicle charger power plant, the safety guardian being operable to: control the switch to the closed position upon receipt of a first signal from a controller associated with the vehicle charger power plant; control the switch to the open position upon receipt of a second signal from the controller; and control the switch to the open position in the absence of the first signal and the second signal.

One non-limiting aspect of the present invention contemplates the safety guardian being operable to receive the first signal as a pulse width modulated (PWM) signal and to output a non-PWM signal to the switch to control the switch between the open and closed positions.

One non-limiting aspect of the present invention contemplates the safety guardian being operable to control the switch to the open position when either one of the first signal and the second signal failed to include an edge within a predefined period of time.

One non-limiting aspect of the present invention contemplates the safety guardian being operable to control the switch to the open position in the event power is lost to the controller.

One non-limiting aspect of the present invention contemplates a safety guardian operable with a vehicle charger system, the vehicle charger system including a charger power plant operable to invert AC energy received from a mains output of an Electronic Vehicle Supply Equipment (EVSE) system to DC energy sufficient for charging a high voltage (HV) vehicle battery, the EVSE system delivering the AC energy when a first reference voltage is received and preventing delivery of the AC energy when a second reference voltage is received, the vehicle charger system including a vehicle interface operable using a control pilot output of the EVSE to generate the first reference voltage when the charger power plant is ready to charge the vehicle battery and to output the second reference voltage when the charger power plant is not ready to charge the vehicle battery, the vehicle interface including a first switch operable between an open position and a closed position and a second switch operable between an open position and a closed position, the vehicle interface generating the first reference voltage when the first and second switches are both in the closed position and the second reference voltage when either one of the first and second switches are in the open position, the vehicle charger system including a controller operable to output a first signal to control the first switch between the open and closed positions and a second signal to control the second switch between the open and closed positions according to whether the charger power plant is ready to charge the vehicle battery, the safety guardian including: a device operable to intercept the first signal output from the safety controller and to output a third signal to the first switch, the third signal being based on the first signal and operable to control the first switch between the open position and the closed position according to whether the charger power plant is ready to charge the vehicle battery, the device being operable in the absence of the first signal to automatically generate the third signal such that the first switch is controlled to the open position.

One non-limiting aspect of the present invention contemplates the device is a retriggerable monostable.

One non-limiting aspect of the present invention contemplates the retriggerable monostable generates the third signal to control the first switch to the open position when the first signal fails to include an edge within a pre-defined period of time.

One non-limiting aspect of the present invention contemplates the retriggerable monostable generates the third signal to control the first switch to the closed position when the first signal includes an edge within a pre-defined period of time.

One non-limiting aspect of the present invention contemplates the first signal alternates between a first voltage and a second voltage at a first frequency and the third signal alternates between a third voltage and a fourth voltage depending on the first frequency, the third signal having the third voltage when the first frequency is greater than a threshold and the third signal having the fourth voltage when the first frequency is less than the threshold.

One non-limiting aspect of the present invention contemplates a voltage regulator configured to maintain operation of the device when the controller loses power while energy is still available from a low voltage (LV) vehicle battery.

One non-limiting aspect of the present invention contemplates charger system including: a charger power plant operable to invert AC energy received from a mains output of an EVSE system to DC energy sufficient for charging a high voltage (HV) vehicle battery; an input operable to receive a control pilot from the EVSE system; a vehicle interface operable with the input to generate a first reference signal using the control pilot when the charger power plant is ready to invert the AC energy to the DC energy and to generate a second reference signal using the control pilot when the charger power plant is not ready to invert the AC energy to the DC energy, the vehicle interface including a first switch operable between an open position and a closed position and a second switch operable between an open position and a closed position, wherein the vehicle interface generates the first reference signal when the first and second switches are both in the closed position and the second reference signal when either one of the first and second switches are in the open position; a safety controller operable to output a first signal for controlling the first switch between the open position and the closed position; a vehicle charger controller operable to output a second signal to the second switch, the second signal controlling the second switch between the open position and the closed position; and a safety guardian operable to receive the first signal output from the safety controller, the safety guardian operable to output a third signal to the first switch, the third signal being based on the first signal and operable to control the first switch between the open position and the closed position.

One non-limiting aspect of the present invention contemplates the safety guardian includes a retriggerable monostable operable to generate the third signal based on the first signal.

One non-limiting aspect of the present invention contemplates the retriggerable monostable generates the third signal to control the first switch to the open position when the first signal fails to include an edge within a pre-defined period of time.

One non-limiting aspect of the present invention contemplates the retriggerable monostable generates the third signal to control the first switch to the closed position when the first signal includes an edge within a pre-defined period of time.

One non-limiting aspect of the present invention contemplates the first signal alternates between a first voltage and a second voltage at a first frequency and the third signal alternates between a third voltage and a fourth voltage depending on the first frequency, the third signal having the third voltage when the first frequency is greater than a threshold and the third signal having the fourth voltage when the first frequency is less than the threshold.

One non-limiting aspect of the present invention contemplates the first voltage equals the third voltage.

One non-limiting aspect of the present invention contemplates a first power supply unit (PSU) operable to power the safety controller and a separate, second PSU operable to power the vehicle charger controller, each of the first PSU and second PSU regulate current from a low voltage (LV) vehicle battery to facilitate powering the respective one of the safety controller and the charger controller.

One non-limiting aspect of the present invention contemplates the safety guardian regulates current from the LV vehicle battery to facilitate generating the third signal, the safety guardian regulating current from the LV battery separately and independently from the first PSU and the second PSU.

One non-limiting aspect of the present invention contemplates the vehicle interface includes a first resistor and a second resistor arranged relative to the first switch and the second switch such that the first resistor and a second resistor are connected in parallel only when both of the first switch and the second switch are in the closed position.

One non-limiting aspect of the present invention contemplates the first and second switches are connected in series with the second resistor.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
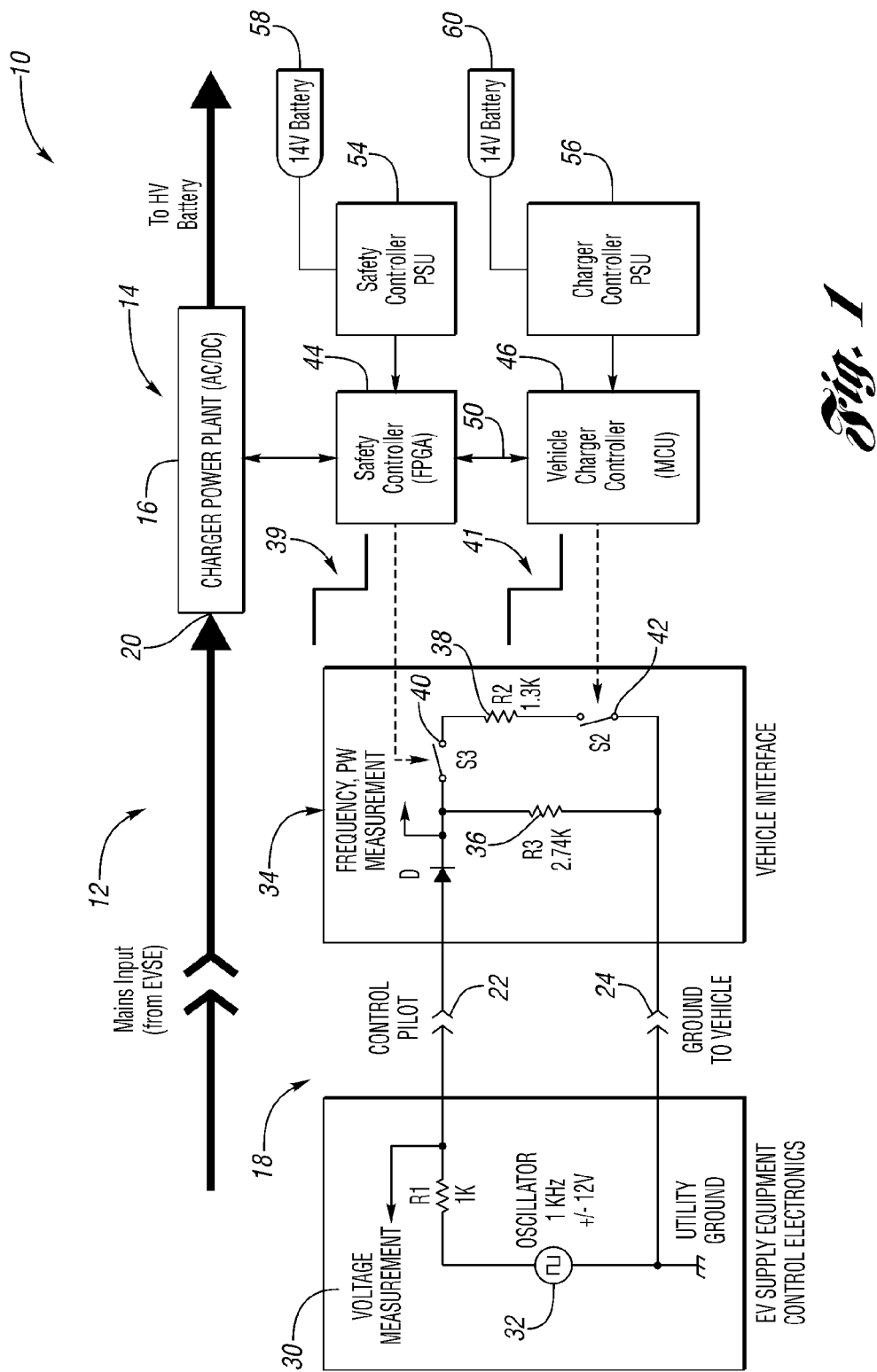
FIG. 1 illustrates a charging system having an Electric Vehicle Supply Equipment (EVSE) system configured to provide energy to a vehicle charging system.

FIG. 1 illustrates a charging system 10 having an Electric Vehicle Supply Equipment (EVSE) system 12 configured to provide energy to a vehicle charging system 14. EVSE system 12 may be configured to provide AC energy to a charger power plant 16 on the vehicle for conversion to DC energy sufficient for charging a high voltage (HV) battery or other electronic storage element. EVSE system 12 may be associated with a wall outlet system or other system sufficiently configured to provide AC energy to charger power plant 16, such as in the manner described within SAE J1772, the disclosure of which is hereby incorporated by reference in its entirety. In addition to or in place of detection logic or other features, EVSE system 12 may include a control pilot circuit 18 through which vehicle charging system 14 is required to communicate whether charger power plant 16 is ready to receive the AC energy.

A cordset (not shown) may be configured to facilitate connecting EVSE system 12 to a receptacle (not shown) included within the vehicle. The receptacle may include an input for connecting to a mains input, a control pilot input 22 for connecting to the control pilot circuit, and a ground input 24 for connecting the vehicle ground to utilities/earth ground. Control pilot circuit 18 may be a low voltage and/or low current system and electrically isolated from the mains input 20. Once connected, control pilot circuit 18 may be used to generate a voltage reference and a voltage measurement node 30 to reflect whether charger power plant 16 is ready to receive DC energy through the mains connection. A controller (not shown) associated with EVSE system 12 may permit or deny delivery of the AC energy to the mains connection depending on the reference voltage.

Control pilot circuit 18 may include an oscillator 32 configured to output a control pilot signal. A vehicle interface portion 34 of the control pilot circuit included on the vehicle may receive the control pilot signal from oscillator 32. Vehicle interface 34 may include a first resistor 36 and a second resistor 38 connectable in series with a first switch 40 and a second switch 42. First switch 40 and second switch 42 may be operable between an open position and a closed position depending on whether a corresponding first and second signal 39, 41 is delivered at a high state (first voltage, e.g., 5V) or a low state (second voltage, e.g., 0V). The closed position may correspond to switches 40, 42 conducting current and the open position may correspond with switches 40, 42 being unable to conduct current. Of course, the "on" and "off" switch voltages may be set with application voltages that depend on the physical implementation of the vehicle interface (e.g., bipolars, MOSFETs, relays, etc.). In the absence of a contrary command, first and second switches 40, 42 may be configured to maintain their current position, i.e., to remain in one of the open and closed positions when no signal is received commanding the switch to change positions.

The voltage measured at voltage measurement node 30 may vary depending on whether first resistor 36 and second resistor 38 are connected in parallel. An EVSE controller (not shown) may be configured to adjust and/or prevent delivery of the AC energy to the mains connection depending on whether the voltage at voltage measurement node 30 is at a first reference voltage or a second reference voltage. The first reference voltage may be associated with first and second switches 40, 42 being in the closed position such that first and second resistors 36, 38 are connected in parallel. The second reference voltage may be associated with either one of first and second switches 40, 42 being in the open position such that the second resistor 38 is disconnected from the rest of the control pilot circuit. Vehicle charging system 14 may include a safety controller 44 and a vehicle charger controller 46 to facilitate respectively outputting first and second signals 39, 41 to the corresponding first and second switches 40, 42.

Vehicle charger controller 46 may be a Micro-Controller Unit (MCU) configured to monitor various operating conditions of charger power plant 16 in order to assess whether charger power plant 16 is ready to receive AC energy from EVSE system 12. Vehicle charger controller 46 may also be configured to control various charging operations of charger power plant 16, including assessing whether the HV battery or other element being charged is sufficiently charged or other conditions in which further delivery of the AC energy from EVSE system 12 is undesirable. Upon completion of the charging event or other condition, vehicle charger controller 46 may adjust second signal 41 in a manner sufficient to open second switch 42, and thereby change the reference voltage and notify the EVSE controller to cease further delivery of AC energy. Optionally, vehicle charging system 14 may include other means for communicating completion of the charging event to EVSE system 12 such that the operations associated with opening second switch 42 may be redundant or secondary means for ensuring the EVSE controller is instructed to cease delivery of AC energy.

Vehicle charger controller 46 may also communicate a signal 50 to safety controller 44 indicating whether first switch 40 should be controlled to the open or closed position. The signal may be the same as second signal 41 communicated to second switch 42 and/or it may be a different signal, such as a data message or data packets having information usable by safety controller 44 to assess whether vehicle charger controller 46 or the vehicle charging system is operating improperly. Safety controller 44 may be a Field Programmable Gate Array (FPGA) program with the ability to override commands of vehicle charger controller 46 or to otherwise assess improper operations in order to ensure that first switch 40 can be opened independently of second switch 42 being commanded to closed position, such as to prevent delivery of the AC energy when the vehicle charging system is operating improperly.

Optionally, safety controller 44 may be configured to provide status information or other information to vehicle charger controller 46 that vehicle charger controller 46 can use to assess whether the safety controller is operating properly. This information can be useful in allowing vehicle charger controller 46 to open second switch 42 when safety controller 44 is unable to properly control first switch 40, such as when power is lost to safety controller 44. Safety controller 44 and vehicle charger controller 46 are shown to be separately connected to independent power supply units (PSUs) 54, 56 in order to ameliorate the possibility of both controllers 44, 46 simultaneously losing power while both of first and second switches 40, 42 are in the closed position. First and second PSUs 54, 56 are shown to have separate connections 58, 60 to a low-voltage (LV) battery (not shown) such that each PSU 54, 56 is responsible for processing current from the LV battery for use in powering its controller.

Figure 2:
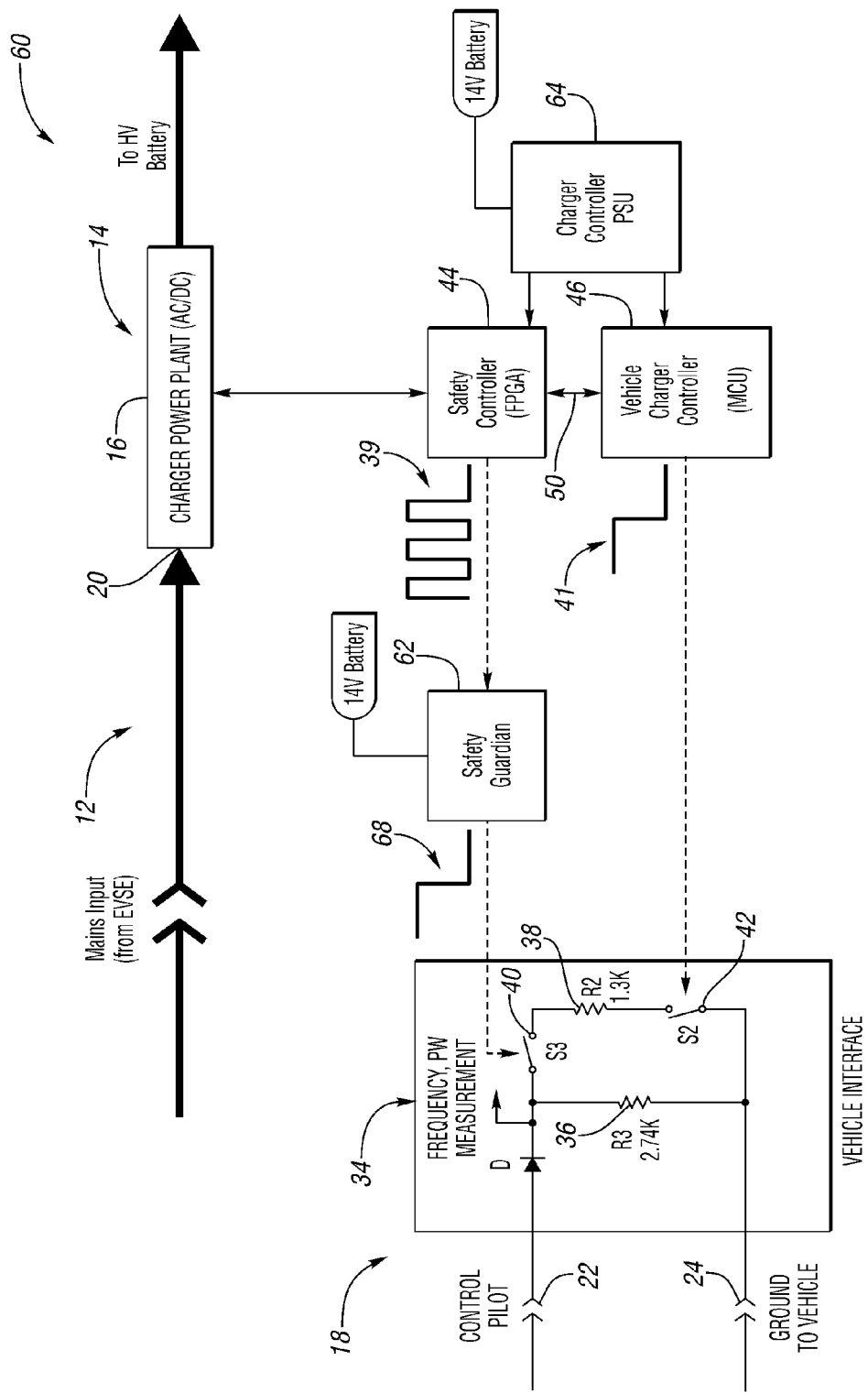
FIG. 2 illustrates a charging system with a safety guardian in accordance with one non-limiting aspect of the present invention.

FIG. 2 illustrates a charging system 60 with a safety guardian 62 in accordance with one non-limiting aspect of the present invention. Safety guardian 62 may be included to ensure at least one of first and second switches 40, 42 is able to be controlled to the open position without having to include multiple PSUs. A single PSU 64 is believed to be beneficial over the dual PSU configuration since it improves cost, power density (i.e., space needed), and reliability (i.e., each extra component can contribute to more faults (ppms) to the whole system reliability). Advantageously, safety guardian 62 operates in cooperation with safety controller 44 and vehicle charger controller 46 such that safety guardian 62 may be added to the system shown in FIG. 1 without having to make significant modifications. Safety guardian 62 may be configured to intercept first signal 39 output from safety controller 44 and to output a corresponding third signal 68 to first switch 40, i.e., to control first switch 40 to the desired open or closed position.

Safety controller 44 in the system of FIG. 2 may be configured to output first signal 39 as a pulse-width modulated (PWM) signal instead of the non-PWM signal shown in the system of FIG. 1. PWM signal 39 may include a plurality of edges such that the PWM signal acts as a "heartbeat". Safety guardian 62 may convert the received PWM signal 39 to non-PWM signal 68 used to control first switch 40 between the open and closed position. Safety guardian 62 may be configured to control first switch 40 to the open position, i.e., to generate third signal 68 at a high state, as long as a sufficient number of edges are detected to be within first signal 39. In the event first signal 39 fails to include a sufficient number of edges, safety guardian 62 may be configured to automatically open first switch 40, i.e., to generate third signal 68 at a low state when the desired "heartbeat" is not detected. Safety controller 62 may be configured in a manner similar to that described above with respect to assessing whether it is desirable to control first switch 40 to the open or closed position.

The edge-detection employed by safety guardian 62 may limit complexity in that safety guardian 62 may not need to assess vehicle charging system operations or otherwise processed data from safety controller 44 and/or vehicle charger controller 46. It may simply assess whether a sufficient PWM signal is being received, and if not, to automatically open first switch 40. The edge-detection employed by safety guardian 62 is also believed to be preferred over fixed-level detection systems since such systems can output a fixed level value when operating improperly, whereas the PWM/isolating method safety guardian is less likely to result in a fixed level output causing a switch to remain open. Safety controller 44 and/or vehicle charger controller 46 may include the same or similar capabilities described above with respect to assessing various vehicle charging system characteristics and operating states when determining whether to continue or discontinue AC energy delivery to the charger power plant, i.e., whether the charger power plant is ready to receive AC energy. Safety controller 44 may be slightly modified to output the PWM signal instead of the non-PWM signal previously communicated directly to the first switch to directly control its movement between the open and closes positions.

Figure 3:
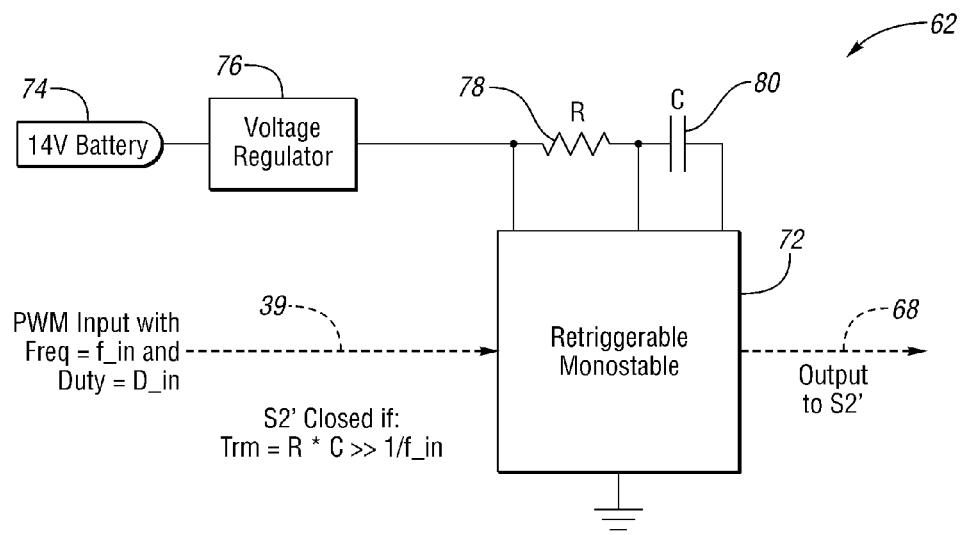
FIG. 3 illustrates the safety guardian as configured as a retriggerable monostable in accordance with one non-limiting aspect of the present invention.
Figure 4:
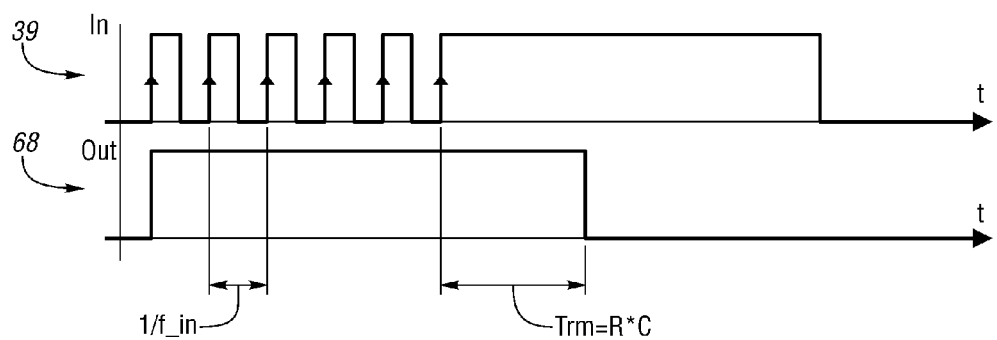
FIG. 4 illustrates a first signal input to the retriggerable monostable and a third signal output from the retriggerable monostable in accordance with one non-limiting aspect of the present invention.

FIG. 3 illustrates the safety guardian 62 as having a retriggerable monostable 72 in accordance with one non-limiting aspect of the present invention. Retriggerable monostable 72 may be configured to output third signal 68 to first switch 40 depending on first signal 39 received from safety controller 44. FIG. 4 illustrates first signal 39 input to retriggerable monostable 72 and third signal 68 output from retriggerable monostable 72. As shown, retriggerable monostable 72 outputs third signal 68 at a high state whenever a sufficient number of edges are received within a predefined period of time in order to control first switch 40 to the closed position. Once the number of edges ceases or fails to occur within a sufficient period of time, retriggable monostable 72 outputs third signal 68 at a low state such that first switch 40 is controlled to the open position.

Retriggerable monostable 72 may be configured to generate a pulse of width Trm every time that a rising edge is detected at its input (also can be configured to work with falling edges). If another rising edge appears prior to the end of the output pulse, then this output pulse may be extended another Trm miliseconds from the last positive input edge. By providing a sequence of edges at the input, the output can be kept in an active value permanently. If the input signal stops (i.e. remains in a fixed value) then the output of the circuit becomes inactive after Trm miliseconds from the last positive edge, i.e., it transitions to the low state. This behavior may be useful to automatically managing first switch 40 to the open position when a disruption occurs within vehicle charger system 14 that results in safety controller 44 either intentionally or unintentionally failing to provide a sufficient PWM signal to maintain first switch 40 is open position.

Retriggerable monostable 72 is shown to include an independent and separate connection 74 to the LV battery. A voltage regulator 76 may be included to facilitate processing of current received from the LV battery. A resistor 78 and a capacitor 80 are also shown to indicate hardware components used to adjust operation of retriggerable monostable 72. By adjusting the values of resistor 78 and capacitor 80, retriggerable monostable 72 adjusts the number of edges that must be detected in order to maintain third signal 68 in the high state, i.e., the length of Trm. This type of configuration, i.e. a hardware-based configuration, may be beneficial over software or other programmable configuration in that it may be less susceptible to operating disruptions, particularly those associated with software-based applications and controls. While the present invention describes safety guardian 62 as a retriggerable monostable 72, this is done for exemplary and non-limiting purposes, as the present invention fully contemplates safety guardian 62 including any sufficiently configured device to support the operations contemplated herein.

Figure 5:
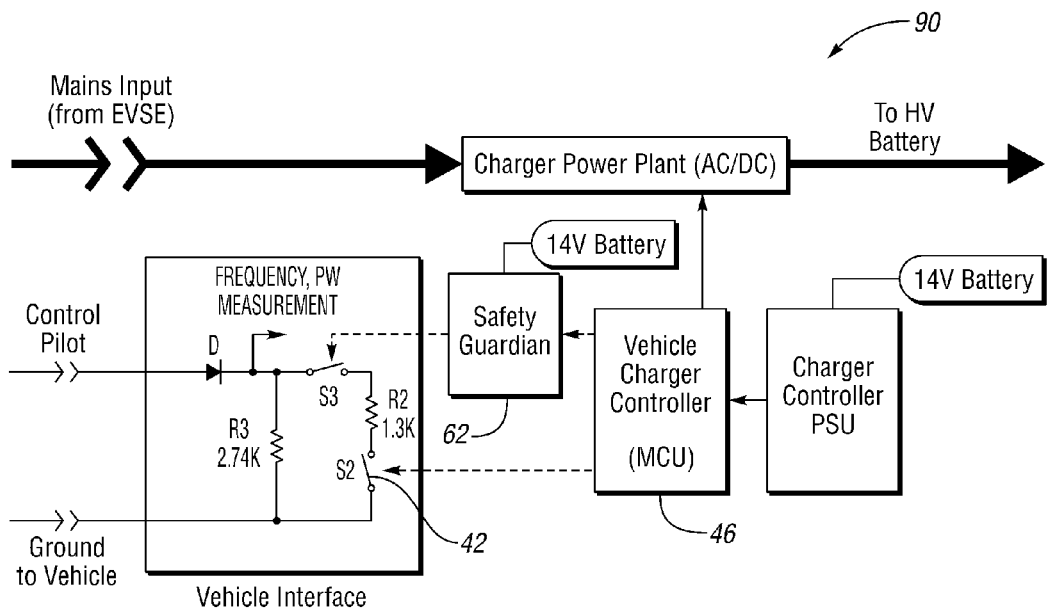
FIG. 5 illustrates a charging system where a safety controller has been eliminated in accordance with one non-limiting aspect of the present invention.

FIG. 5 illustrates a charging system 90 where the safety controller has been eliminated in accordance with one non-limiting aspect of the present invention. The elimination of the safety controller may be beneficial in reducing system cost and complexity. Vehicle charger controller 46 may be configured to implement some or all of the operations previously implemented with the safety controller, e.g., monitoring various safety-related operating characteristics for use in assessing whether the first switch should be controlled to the open position. Safety guardian 62 may operate in the same manner described above with respect to FIG. 4.

Figure 6:
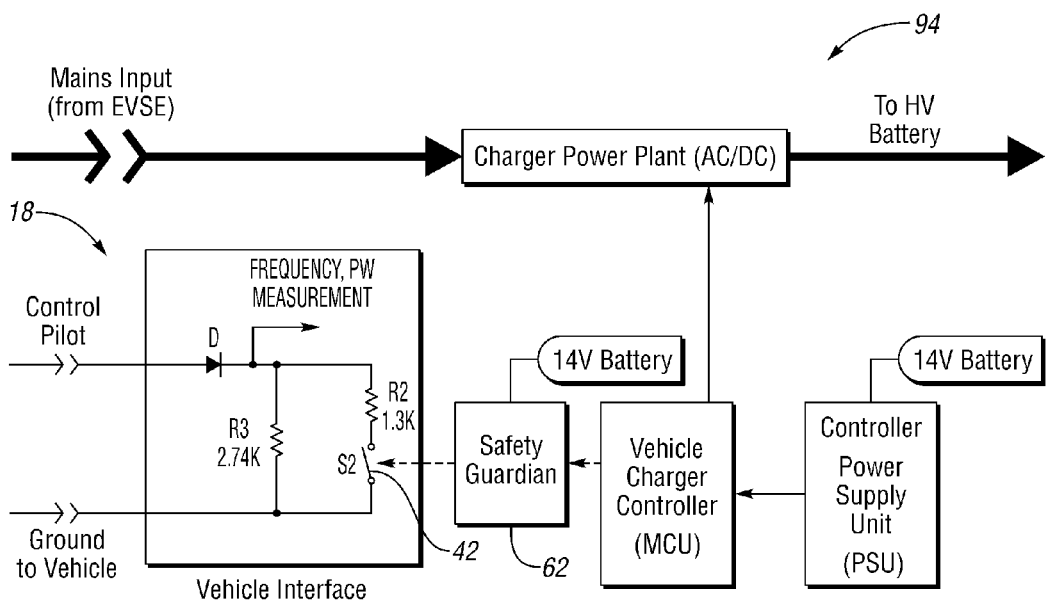
FIG. 6 illustrates a charging system where a first switch has been eliminated in accordance with one non-limiting aspect of the present invention.

FIG. 6 illustrates a charging system 94 where the first switch has been eliminated in accordance with one non-limiting aspect of the present invention. The elimination of the first switch may be beneficial in simplifying the configuration of pilot control circuit 18. System 94 may operate similarly to the systems described above with respect to safety guardian 62 requiring a sufficient PWM signal in order to output a non-PWM signal sufficient to control second switch 42 to the closed position such that second switch 42 is automatically controlled to the open position in the absence of the sufficient PWM signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charger system comprising:
a charger power plant operable to invert AC energy received from a mains output of an Electronic Vehicle Supply Equipment (EVSE) system to DC energy sufficient for charging a high voltage (HV) vehicle battery;
an input operable to receive a control pilot from the EVSE system;
a vehicle interface operable with the input to generate a first reference signal using the control pilot when the charger power plant is ready to invert the AC energy to the DC energy and to generate a second reference signal using the control pilot when the charger power plant is not ready to invert the AC energy to the DC energy, the vehicle interface including a first switch operable between an open position and a closed position and a second switch operable between an open position and a closed position, wherein the vehicle interface generates the first reference signal when the first and second switches are both in the closed position and the second reference signal when either one of the first and second switches are in the open position;
a safety controller operable to output a first signal for controlling the first switch between the open position and the closed position;
a vehicle charger controller operable to output a second signal to the second switch, the second signal controlling the second switch between the open position and the closed position; and
a safety guardian operable to receive the first signal output from the safety controller, the safety guardian operable to output a third signal to the first switch, the third signal being based on the first signal and operable to control the first switch between the open position and the closed position.

2. The system of claim 1 wherein the safety guardian includes a retriggerable monostable operable to generate the third signal based on the first signal.

3. The system of claim 2 wherein the retriggerable monostable generates the third signal to control the first switch to the open position when the first signal fails to include an edge within a pre-defined period of time.

4. The system of claim 2 wherein the retriggerable monostable generates the third signal to control the first switch to the closed position when the first signal includes an edge within a pre-defined period of time.

5. The system of claim 2 wherein the first signal alternates between a first voltage and a second voltage at a first frequency and the third signal alternates between a third voltage and a fourth voltage depending on the first frequency, the third signal having the third voltage when the first frequency is greater than a threshold and the third signal having the fourth voltage when the first frequency is less than the threshold.

6. The system of claim 5 wherein the first voltage equals the third voltage.

7. The system of claim 1 further comprising a first power supply unit (PSU) operable to power the safety controller and a separate, second PSU operable to power the vehicle charger controller, each of the first PSU and second PSU regulate current from a low voltage (LV) vehicle battery to facilitate powering the respective one of the safety controller and the charger controller.

8. The system of claim 7 wherein the safety guardian regulates current from the LV vehicle battery to facilitate generating the third signal, the safety guardian regulating current from the LV battery separately and independently from the first PSU and the second PSU.

9. The system of claim 1 wherein the vehicle interface includes a first resistor and a second resistor arranged relative to the first switch and the second switch such that the first resistor and the second resistor are connected in parallel only when both of the first and second switches are in the closed position.

10. The system of claim 9 wherein the first switch and the second switch are connected in series with the second resistor.

* * * * *